United States Patent [19]

Rios

[11] 4,277,705

[45] Jul. 7, 1981

[54] METHOD AND APPARATUS FOR COOLING A WINDING IN THE ROTOR OF AN ELECTRICAL MACHINE

[75] Inventor: Pedro A. Rios, Schenectady, N.Y.

[73] Assignee: Electric Power Research Institute, Palo Alto, Calif.

[21] Appl. No.: 830,131

[22] Filed: Sep. 2, 1977

[51] Int. Cl.³ ............................................. H02K 3/24
[52] U.S. Cl. ........................................ 310/64; 310/45; 310/215; 310/261
[58] Field of Search ....................... 310/10, 54, 45, 40, 310/64, 52, 61, 261, 65, 45, 68 C, 214, 215; 164/135; 361/386; 336/61

[56] References Cited

U.S. PATENT DOCUMENTS

| 2,190,887 | 2/1940 | Schaeren | 310/214 |
|---|---|---|---|
| 3,130,335 | 4/1964 | Rejda | 310/215 |
| 3,471,726 | 10/1969 | Burnier | 310/10 |
| 3,590,327 | 6/1971 | Thomae | 361/386 |
| 3,679,920 | 7/1972 | MacNab | 310/52 |
| 3,742,265 | 6/1973 | Smith | 310/52 |
| 3,983,427 | 9/1976 | Ulke | 310/61 |
| 3,991,333 | 11/1976 | Laskaris | 310/52 |
| 4,001,616 | 1/1977 | Lonseth | 310/45 |
| 4,001,616 | 1/1977 | Lonseth | 310/215 |
| 4,081,776 | 3/1978 | Hisamoto | 336/61 |
| 4,085,343 | 4/1978 | Hasegawa | 310/52 |

FOREIGN PATENT DOCUMENTS

| 638999 | 3/1962 | Canada | 310/215 |
|---|---|---|---|
| 932013 | 8/1973 | Canada | 310/215 |
| 587773 | 10/1933 | Fed. Rep. of Germany | 310/215 |

Primary Examiner—R. Skudy
Attorney, Agent, or Firm—Flehr, Hohbach, Test, Albritton & Herbert

[57] ABSTRACT

Means for cooling a winding in the rotor of an electrical machine that is cooled by a flow of liquefied gas. The winding is covered by a heat conductive sheath that transfers the heat developed in the winding to a pool of the liquefied gas. The winding and conductive sheath are insulated by a thermal shield from sources of heat exterior to the winding. The winding and the conductive sheath have a support structure that is provided with cooling channels through which the liquefied gas flows. These channels allow the other components of the rotor to be cooled independently from the winding.

9 Claims, 7 Drawing Figures

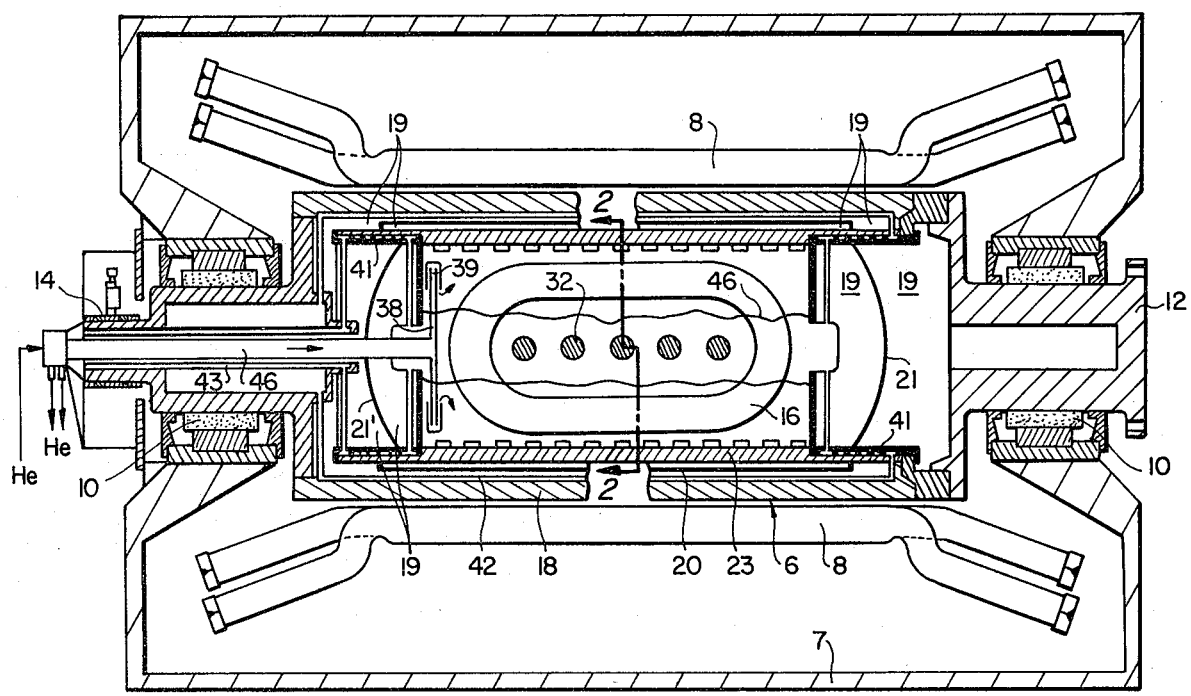
FIG_1
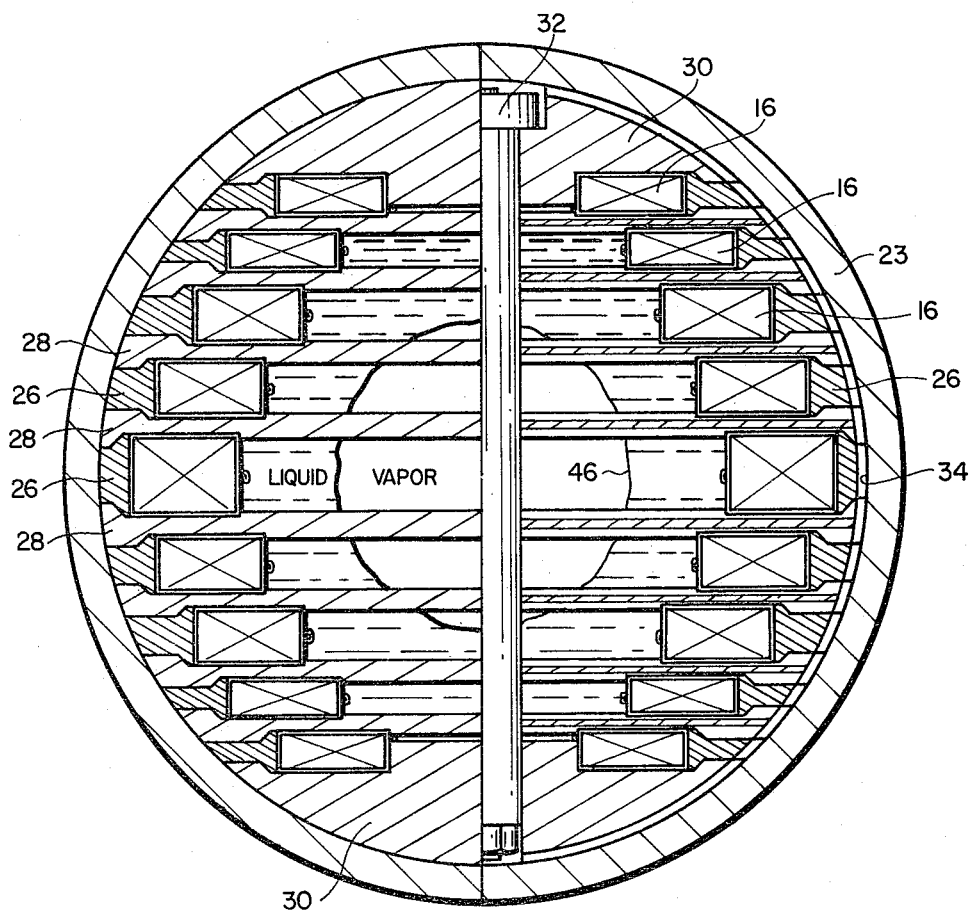
FIG_2

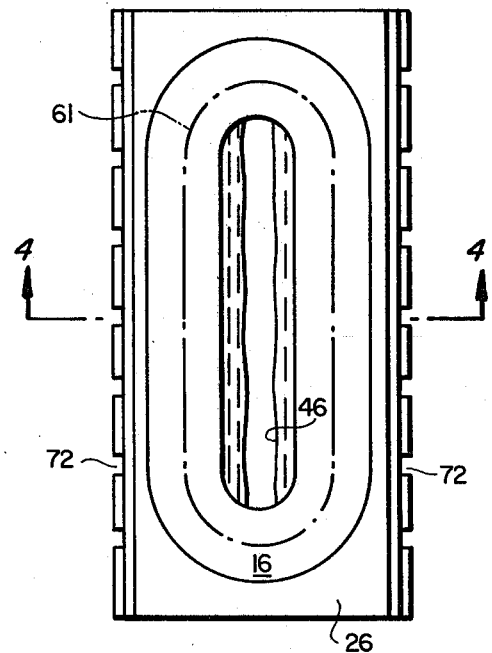
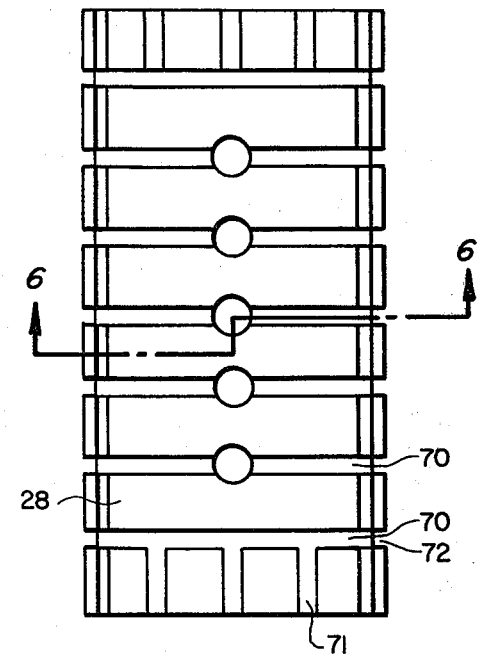
FIG_3
FIG_5
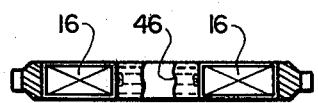
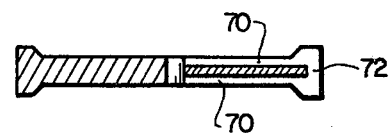
FIG_4
FIG_6
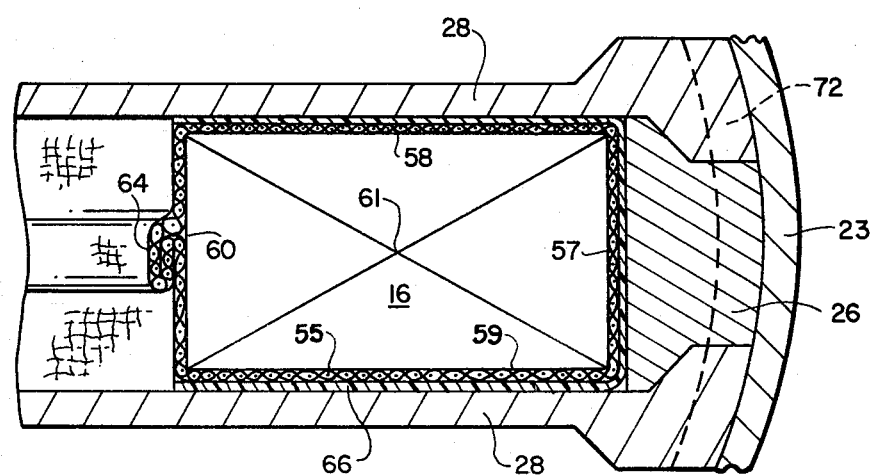
FIG_7

METHOD AND APPARATUS FOR COOLING A WINDING IN THE ROTOR OF AN ELECTRICAL MACHINE

BACKGROUND OF THE INVENTION

This invention generally relates to electrical machines, and more particularly, to means for cooling the rotors in both motors and generators during operation.

In a large superconducting synchronous generator the reliable operation of the superconducting field winding at high current densities is critical. In these machines high current densities in the field winding can be achieved only when the temperature of the winding is constantly maintained at or below the boiling point of liquid helium. In a typical filamentary niobium-titanium superconductor, at magnetic fields of 7.5 Tesla, each degree of temperature drop of below 4.2° K. increases the critical current density of the superconductor by approximately 50%.

One type of superconducting generator is illustrated in FIG. 1. The generator includes a rotor 6 that is supported by two bearings 10 in a housing 7. The rotor turns within the stator bars 8 and is rotated by a turbine (not shown) attached to the coupling 12. The field winding in the rotor is energized through the collector rings 14.

The rotor 6 contains a superconducting field winding 16 which is cooled to liquid helium operating temperatures. The winding is housed within an electromagnetic shield 18 that also serves as a vacuum envelope for the winding. The interior of the rotor at points 19 is permanently evacuated in order to insulate the rotor from other components of the generator operating at ambient temperature. The electromagnetic shield also screens the superconducting winding from non-sychronous components of the magnetic fields produced by unbalanced or transient currents in the stator 8. Inside of the electromagnetic shield is a thermal radiation shield 20 which is cooled to an intermediate temperature of between 80° K. and 100° K. This shield absorbs thermal radiation from the ambient temperature electromagnetic shield 18 and re-radiates it at a lower temperature. The winding 16 is also protected at its ends by two thermal radiation shields 21, 21'.

Inside of these shields is the torque tube 23 which transmits the torsional forces from the rotor winding 16 through the coupling 12 to the turbine (not shown). The torque tube is illustrated in FIG. 2 in end elevation. The torque tube houses nine, epoxy resin impregnated, superconducting winding modules 16. Each superconducting winding module is racetrack shaped and is manufactured from stabilized, niobium-titanium multifilamentary superconductor. The superconductor is wound and impregnated with epoxy resin. The epoxy resin is reinforced with glass cloth. Referring to FIG. 3, each winding module 16 is supported by a thick aluminum housing 26 that is machined from a rectangular plate to fit the outer surface of each winding module. Referring to FIGS. 2 and 5, spaced between adjacent housings 26 is a thin aluminum support plate 28. The longitudinal sides of each plate are machined to form wedges that fit the tapered edges of the corresponding housings 26. In addition, two aluminum pole segments 30, FIG. 2, are located at opposite ends of the winding stack. The assembly of winding modules 16, housings 26, support plates 28, and pole segments 30 is fastened together by five cross bolts 32 located along the longitudinal axis of the rotor. These cross bolts hold the structure together so that it can be inserted into the cylindrical torque tube 23, FIG. 2. The torque tube is shrunk onto the assembly, and the assembly is prevented from rotating relative to the torque tube by a plurality of keys (not shown). The torque tube is fabricated from either a FeNiCr-base austenitic stainless steel or a nickel-base stainless steel.

Referring to FIG. 1, the field winding 16 is cooled by the flow of liquid helium through the rotor. Saturated liquid helium is delivered to a central supply tube 36 from a liquefier or supply dewar (not shown). The liquid helium flows along the axis of rotation of the rotor into the torque tube 23. The liquid helium is distributed in the rotor by a radial supply tube 38 and a level control 39.

In steady-state operation the liquid helium boils as a result of the heat transferred into the cold region of the rotor. Two separate streams of boil-off vapor are removed from the rotor. One stream passes through a series of spiral flow channels 41, then through passage 42 that runs across the inner side wall of the electromagnetic shield 6 and thereafter through the exhaust tube 43 which is concentric with the central supply tube 36. The other stream of vapor passes through a second plurality of spiral flow channels 41' which also connect to the concentric exhaust tube 43. The warm helium vapor thereafter flows out of the generator and is returned to the liquefier (not shown).

When the rotor 6 turns, the centrifugal force on the rotor causes the liquid to assume the shape of a cylinder having an annular cross section, FIG. 2. The lighter weight helium vapor becomes centered about the axis of rotation of the rotor. The cylindrically shaped surface between the liquid and vapor is indicated by reference numeral 46, FIG. 2. The pool of liquid helium rotates at the peripheral speed of the rotor. The level control 39, FIG. 1, regulates the radial depth of the liquid. The pressure of the helium vapor at the liquid pool surface 46 is maintained at a predetermined value by the balance of the hydrostatic pressures in the rotating gravitational field. The maintenance of the pressure of the vapor at a predetermined value fixes the temperature of the liquid helium at the surface 46. This temperature corresponds to the saturation temperature of helium at the specified pressure.

One problem with helium cooled rotors of the type described above is minimizing the radial temperature gradient created across the cylindrical pool of liquid helium. When the pool of liquid helium rotates with the rotor and thermal conduction in the radial direction is low, a temperature gradient is established within the liquid. The temperature distribution within the pool corresponds to the adiabatic temperature rise of a particle of fluid as it moves radially within the pool and is compressed by the local equilibrium hydrostatic pressure. The pool is stable until the temperature gradient exceeds the gradient corresponding to adiabatic compression. At this point bouyancy forces will cause circulation of the warmer, less dense fluid to the surface of the pool, where it is cooled by boiling or evaporation. Each superconducting winding module 16 operates at some intermediate temperature between the temperature of the fluid at the interface 46 and the outer radius 34, FIG. 2, of the liquid cylinder.

Another problem occurs if the temperature difference between the superconductor and the coldest portion of the liquid helium cannot be substantially reduced. The temperature of the superconductor in the winding is nearly uniform. Currently, these windings are covered with a layer of glass reinforced epoxy resin which is the major thermal resistance to transferring heat from the winding to the liquid helium. The thermal conductivity of the area filled with superconductor is relatively high. The problem arises because the most critical location where quench is initiated is along the inner radius of the winding and insufficient heat transfer causes the temperature of the winding near the inner radius to increase to an intermediate value between the temperatures at the inner and the outer pool radii.

Further, recent studies have shown that substantially more thermal margin is needed over prior methods of cooling in order to maintain superconductivity in the windings during accidental temperature excursions. For example, if the high voltage side of a generator transformer is short-circuited, the heat input to the rotor from the circulating currents generated in the torque tube is substantial. This heat input causes a rise in the temperature of the liquid helium in the vicinity of the torque tube, thereby causing the superconducting winding temperature to rise. Prior winding support structures are incapable of transferring the heat generated by the electrical transient to the liquid helium without excessively heating the windings.

Heretofore, solutions to these problems have included adding passages for liquid helium in close proximity to the winding 16 and machining the winding support structure 28 for optimum thermal contact with the winding modules 16. The support structure 28 has also been fabricated from aluminum so that it can act as a thermal fin. A shallow liquid helium pool has also been used to minimize the temperature difference caused by compression of the liquid in the pool.

Although all of these approaches have proven to have benefit during steady-state operation, the problem of minimizing the heat input into the superconducting windings during electrical transients, and effectively removing the heat generated in the torque tube has never been effectively solved.

OBJECTS AND SUMMARY OF THE INVENTION

The primary object of the present invention is to overcome the limitations and disadvantages of the prior art.

An object of the present invention is to improve the performance of a winding cooled by a liquefied gas.

An additional object of the present invention is to cool the winding in the rotor of an electrical machine sufficiently so that its temperature remains as uniform as possible during transient conditions and is stabilized as closely as possible to the temperature of the surface of the liquefied gas pool at the inner radius.

A further object of the present invention is to insulate the superconducting winding in the rotor from warmer liquid helium circulating in the rotor away from the liquid helium pool surface and to insulate the winding from both the torque tube and the winding support structure.

Another object of the present invention is to cool the rotor torque tube directly with liquid helium and in performing this cooling to allow the use of relatively warmer liquid helium than the liquid helium used in cooling the winding.

These and other objects are achieved by an apparatus for cooling a winding in the rotor of an electrical machine that is cooled by a flow of liquefied gas. The winding is surrounded by a heat conductive sheath for transferring the heat developed in the winding directly to the pool of liquefied gas. The winding and the heat conductive sheath are also insulated by a thermal shield from sources of heat exterior to the winding. The winding and heat conductive sheath have a support structure that is provided with channels through which the liquefied gas flows. These channels allow the rotor torque tube and the support structure to be cooled independently from the winding.

Additional objects and features of the invention will appear from the following description in which the preferred embodiment has been set forth in detail in conjunction with the accompanying drawings.

BRIEF DESCRIPTION OF THE DRAWINGS

FIG. 1 is a side elevation, in section, of a superconducting electrical generator according to the present invention.

FIG. 2 is an end elevation taken in section along line 2—2 of FIG. 1 of the torque tube of the generator of FIG. 1. The torque tube of FIG. 2 is also rotated 90° about its principal axis from the torque tube illustrated in FIG. 1.

FIG. 3 is a top plan view of a winding module and its associated housing as illustrated in FIG. 2.

FIG. 4 is an end elevation in section taken along line 4—4 of FIG. 3 of the winding module and housing of FIG. 3.

FIG. 5 is a top plan view of a winding support plate as illustrated in FIG. 2.

FIG. 6 is an end elevation in section taken along line 6—6 of FIG. 5 of the support plate of FIG. 5.

FIG. 7 is an enlarged end elevation, partially broken away, of the winding, housing, and support plates illustrated in FIG. 2.

DESCRIPTION OF THE PREFERRED EMBODIMENT

FIGS. 2–7 illustrate an apparatus for cooling the winding in the rotor of an electrical generator. In FIG. 2, the cross section of the torque tube 23 of the rotor is shown. Within the torque tube are nine winding modules 16 of known construction. Each module is fabricated from stabilized, multifilamentary niobium-titanium superconductor. The winding is impregnated with epoxy resin. Each winding module has a racetrack shape in plan view, FIG. 3, and the center of each is hollow. During operation the hollow center is filled with liquid helium and vapor. Each segment of the racetrack has a rectangular cross section, FIG. 7. Each winding module is supported in the substantially rectangular housing 26 described above.

Referring to FIG. 7, around each winding module 16 is placed a heat conductive sheath 55. The sheath acts like a thermal shunt and conducts the heat generated within the winding away from the outer radius of the torque tube and toward the axis of rotation (the principal axis) of the rotor. In effect, the heat generated in the winding is transferred from the outer side wall 57 of the winding to the inner side wall 60. Heat is transferred in this direction in order to maintain the temperature of the winding as closely as possible to the saturation temperature corresponding to the pressure at the surface 46 of the rotating liquid helium pool.

In the preferred embodiment the conductive sheath is a mesh woven from both heat conductive filaments and electrically non-conductive filaments. The heat conductive filaments are copper and are positioned to conduct heat from the outer side wall 57 of the winding along the upper and lower side walls 58, 59, to the inner side wall 50. The conductive filaments generally lie in flat planes that are orthogonal to the central axis 61, FIG. 3, of each winding module. The plane of FIG. 7 is one of these planes. The electrically non-conductive filaments are fabricated from plastic and are positioned to reduce the circulating current losses at the surface of each winding module caused by changes in the field. The non-conductive filaments generally lie in parallel with the central axis 61 of each winding module.

The woven mesh is bonded by an adhesive that penetrates around the filaments and directly contacts the surface of each winding module 16. The mesh remains in thermal contact with the winding module. In the bonding process the conductive sheath 55 is folded along the inner side wall 60 of the winding module to form a thermal fin 64, FIG. 7. This thermal fin increases the heat transfer area of the sheath so that heat can be more efficiently transferred from the winding to the liquid helium located near the surface of the liquid pool.

The conductive sheath 55, FIG. 7, is bonded to the winding 16 using an adhesive that forms a thermal shield 66. In the preferred embodiment this shield is fabricated from epoxy resin and glass cloth. The shield thermally insulates the winding 16 and the sheath 55 from the support plates 28, the winding housing 26, and the torque tube 23. It should be noted that the inner side wall 60 of the winding is exposed to the liquid helium pool and is not covered by the shield 66.

Referring to FIGS. 5 and 6, each support plate 28 is provided with a plurality of lateral cooling channels 70 located on both sides of its winding support surface. These channels permit liquid helium to physically contact the surfaces of the thermal shield 66 and the winding housing 26 at the interfere of the support plate. These lateral channels also connect to a plurality of peripheral cooling channels 72 which communicate with the inner side wall of the torque tube 23. Each winding housing 26, FIG. 3, also has peripheral channels 72 so that circular flow paths are developed around the inner side wall of the torque tube 23. The peripheral channels permit liquid helium to flow along the interface between the torque tube and the winding stack. The lateral channels and peripheral channels transfer the heat generated in the torque tube, the support plates, and the housings directly to the liquid helium, and then, by natural convection, to the surface 46 of the liquid helium pool. During operation, the liquid helium that circulates in these channels can be warmer than the liquid helium that cools the winding modules 16 because the thermal shield 55 insulates the winding modules 16. In addition, the thermal shield and the sheath permit the winding modules to be cooled independently from the torque tube and the support plates.

In the above described arrangement the temperature of the liquid helium in contact with the torque tube 23 corresponds to liquid helium that is adiabatically compressed from the liquid helium pool surface pressure. Although a radial temperature gradient may be established within the torque tube, the temperature of each winding module 16 follows the temperature of the conductive sheath 55 that is exposed to the liquid helium at the inner side wall 60, FIG. 7, of the winding and proximate to the surface 46 of the liquid pool. Thus, the superconducting field winding is stabilized as closely as possible to the temperature of the surface of the liquid pool and the conductive sheath maintains the temperature in the winding as uniformly as possible. In addition, the thermal shield 66 isolates the winding module 16 from temperature excursions experienced by the torque tube 23 and the winding support structure 28.

Although the preferred embodiment is disclosed in the superconducting winding of a generator rotor, the present invention contemplates use in any rotor of an electrical machine that is cooled by a liquefied gas using its latent heat of a vaporization. Such gases include nitrogen, helium, and air. In addition, a perforated conductive screen can also be used for the conductive sheath 55.

Thus, although the best mode contemplated for carrying out the present invention has been herein shown and described, it will be apparent that modification and variation may be made without departing from what is regarded as the subject matter of the invention.

What is claimed is:

1. Apparatus for cooling a winding in a rotor of an electrical machine, comprising:
   (a) a winding for carrying current in a rotor of an electrical machine, said winding cooled by a flow of liquefied gas through the rotor;
   (b) a heat conductive mesh surrounding the winding and in thermal contact therewith for transferring heat developed in the winding to the liquefied gas, said mesh being perforated by a plurality of holes; and woven from both heat conductive filaments and electrically non-conductive filaments, the heat conductive filaments are woven into the mesh in a predetermined alignment so that heat developed in the winding is directed inward substantially toward the principal axis of the rotor and the electrically non-conductive filaments are woven into the mesh in a second predetermined alignment so that circulating currents are prevented from being conducted by the mesh in a direction parallel with the principal axis of the rotor; and
   (c) an adhesive material serving to attach the mesh to the winding, said adhesive penetrates through the holes in the mesh to the surface of the winding.

2. An apparatus as in claim 1 in which the thermally conductive filaments in the mesh are copper and the electrically non-conductive filaments in the mesh are plastic.

3. Apparatus for cooling a winding in a rotor of an electrical machine, comprising:
   (a) a winding for carrying current in a rotor of an electrical machine, said winding cooled by a flow of liquefied gas through the rotor;
   (b) a heat conductive mesh surrounding the winding and in thermal contact therewith for transferring heat developed in the winding to the liquefied gas, said mesh being perforated by a plurality of holes and includes a fin for increasing the heat transfer area of the mesh in thermal communication with the liquefied gas; and
   (c) an adhesive material serving to attach the mesh to the winding, said adhesive penetrates through the holes in the mesh to the surface of the winding.

4. An apparatus as in claim 3 in which the liquefied gas is helium and the current carrying winding is a superconducting field winding in an electrical generator.

5. Apparatus for cooling a winding in a rotor of an electrical machine, comprising:

(a) a winding for carrying current in a rotor of an electrical machine, said winding cooled by a flow of liquefied gas through the rotor;

(b) a heat conductive mesh surrounding the winding and in thermal contact therewith for transferring heat developed in the winding to the liquefied gas, said mesh being perforated by a plurality of holes and including a fin for increasing the heat transfer area of the mesh in thermal communication with the liquefied gas; and (c) an adhesive material serving to attach the mesh to the winding, said adhesive penetrates through the holes in the mesh to the surface of the winding and thermally insulates the mesh and the winding from sources of heat exterior to the winding.

6. Apparatus for cooling and thermally insulating a winding in a rotor of an electrical machine, comprising:

(a) a winding for carrying current in a rotor of an electrical machine, said winding being cooled by a flow of liquefied gas through the rotor;

(b) a heat conducting mesh surrounding the winding and in thermal contact therewith for transferring heat developed in the winding to the liquefied gas; said mesh being perforated by a plurality of holes and woven from both heat conductive filaments and electrically non-conductive filaments, the heat conductive filaments are woven into the mesh in a predetermined alignment so that heat developed in the winding is directed inward substantially toward the principal axis of the rotor and the electrically non-conductive filaments are woven into the mesh in a second predetermined alignment so that circulating currents are prevented from being conducted by the mesh in a direction parallel with the principal axis of the rotor.

7. An apparatus as in claim 6 and further including (c) a torque tube for housing the winding and the heat conducting member;

(d) means connected to the winding and the heat conducting member for supporting the winding and the heat conducting member within the torque tube; and said means for supporting having a plurality of flow passages for bringing the liquefied gas into direct physical contact with the torque tube so that the torque tube can be internally cooled by convection; and (e) thermal shielding means attached to the heat conducting member for insulating the winding and the heat conducting member from heat developed in the torque tube and the supporting means.

8. An apparatus as in claim 7 in which said means for supporting has internal liquefied gas flow passages which permit a circumferential flow of liquefied gas around the inner side wall of said torque tube.

9. An apparatus as in claim 7 in which the winding and the heat conducting mesh are cooled independently from the torque tube and the supporting means.

* * * * *